(12) United States Patent
Inoue et al.

(10) Patent No.: US 6,442,964 B1
(45) Date of Patent: Sep. 3, 2002

(54) ABSORPTION REFRIGERATING MACHINE

(75) Inventors: Naoyuki Inoue; Toshio Matsubara; Tomoyoshi Irie, all of Tokyo (JP)

(73) Assignee: Ebara Corporation, Tokyo (JP)

( * ) Notice: Subject to any disclaimer, the term of this patent is extended or adjusted under 35 U.S.C. 154(b) by 0 days.

(21) Appl. No.: 09/806,504

(22) PCT Filed: Oct. 15, 1999

(86) PCT No.: PCT/JP99/05701

§ 371 (c)(1),
(2), (4) Date: Jun. 25, 2001

(87) PCT Pub. No.: WO00/22357

PCT Pub. Date: Apr. 20, 2000

(30) Foreign Application Priority Data

Oct. 15, 1998 (JP) .......................... 10-293494

(51) Int. Cl.$^7$ ................................ F25B 15/00
(52) U.S. Cl. ............................ 62/476; 62/485
(58) Field of Search .................. 62/476, 484, 485, 62/494; 165/140

(56) References Cited

U.S. PATENT DOCUMENTS 4,763,488 A * 8/1988 Johnston .................. 62/497
5,282,507 A * 2/1994 Tongu et al. .............. 165/165
6,041,617 A * 3/2000 Sanada et al. ............. 62/480
6,158,238 A * 12/2000 Lampinen et al. ......... 62/484

FOREIGN PATENT DOCUMENTS

| JP | 57-10086 | 1/1982 |
| JP | 3-50463 | 3/1991 |
| JP | 9-138082 | 5/1997 |
| JP | 9-273825 | 10/1997 |
| JP | 9-318184 | 12/1997 |
| JP | 10-300260 | 11/1998 |

* cited by examiner

Primary Examiner—Denise L. Esquivel
Assistant Examiner—Melvin Jones
(74) Attorney, Agent, or Firm—Armstrong, Westerman & Hattori, LLP

(57) ABSTRACT

An absorption refrigerating machine according to the present invention has a system for flowing cooling water in parallel to an absorber and a condenser. The absorption refrigerating machine is constituted such that plate type heat exchangers $H_1$, $H_3$ are used in an absorber A and a condenser C, and the amounts of cooling water distributed to the absorber and the condenser are determined mainly based on fluid resistance of each of the plate type heat exchangers.

5 Claims, 3 Drawing Sheets

F I G. 1
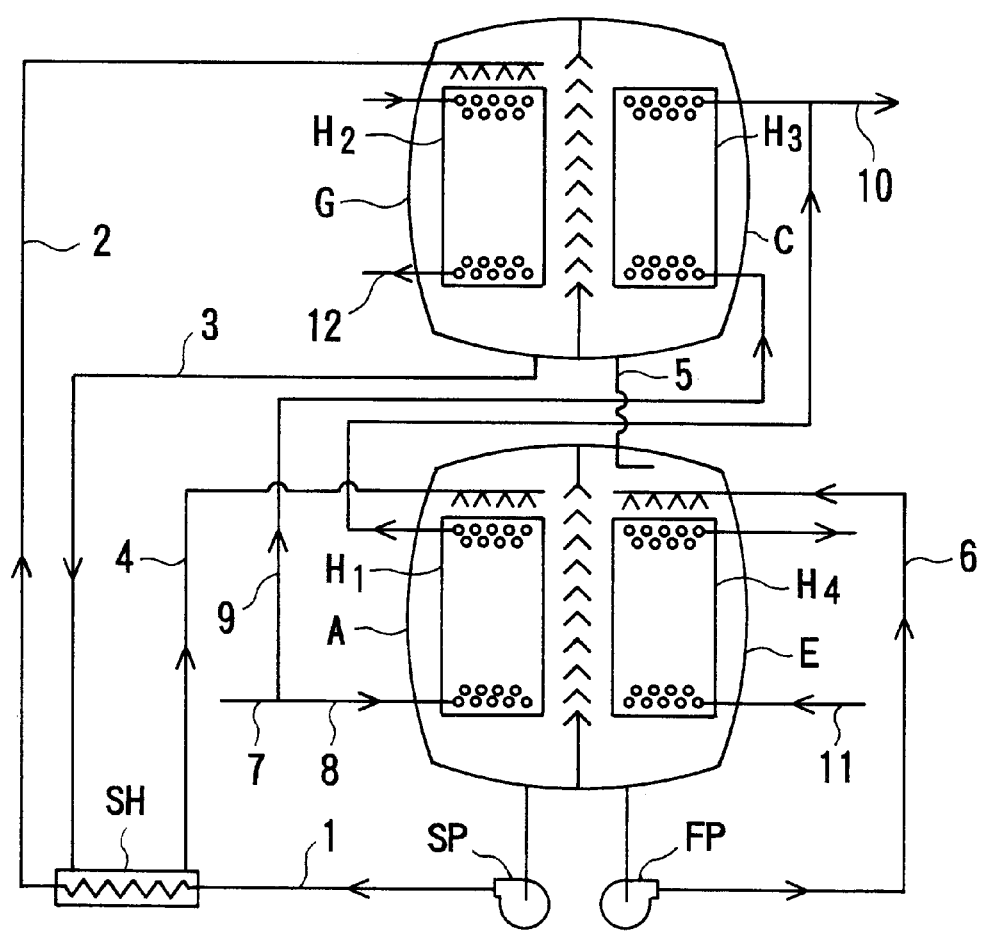

ABSORPTION REFRIGERATING MACHINE

TECHNICAL FIELD

The present invention relates to an absorption refrigerating machine, and more particularly to an absorption refrigerating machine characterized by a system for supply of cooling water to an absorber and a condenser.

BACKGROUND ART

Generally, cooling water for an absorption refrigerating machine has heretofore been flowed in series to an absorber A and a condenser C by a shell and tube system, as shown in FIG. 4.

In FIG. 4, a concentrated solution changes into a dilute solution by absorbing, in the absorber A, a refrigerant vapor evaporated in an evaporator E. The dilute solution is passed through a passage 1 and a heated side of a solution heat exchanger SH, and then introduced into a regenerator G via a passage 2 by a solution pump SP. The dilute solution introduced into the regenerator G is heated by a heat source 12 to evaporate the refrigerant, so that the dilute solution changes into a concentrated solution. The concentrated solution is passed through a passage 3 and a heating side of the solution heat exchanger SH, and then introduced via a passage 4 into the absorber A, where the concentrated solution absorbs a refrigerant vapor again to change into a dilute solution. Thus, the solution is circulated.

On the other hand, the refrigerant becomes a refrigerant vapor by being evaporated in the regenerator G. The refrigerant vapor reaches the condenser C, where the refrigerant vapor is condensed into a refrigerant liquid, which is introduced into the evaporator E via a passage 5. While the introduced refrigerant liquid is circulated into the evaporator E via a passage 6 by a refrigerant pump FP, the refrigerant liquid is evaporated in the evaporator E for cooling chilled water 11. The evaporated refrigerant reaches the absorber A, where the refrigerant is absorbed into the concentrated solution. The absorbed refrigerant reaches the regenerator G, where the refrigerant is evaporated. Thus, the refrigerant is circulated. The cooling water is introduced through a passage 7, passed through the absorber A and the condenser C, and is discharged through a passage 10.

In this case, the amount of cooling water flowed is determined one-sidedly by the required amount of cooling water in one of the absorber and the condenser.

When a large number of plate type heat exchangers are stacked and used for exchanging heat in an absorption refrigerating machine, a large flow rate requires a large passage area between the plates, so that the efficiency of heat exchange is lowered. Therefore, when a plate type heat exchanger is employed for heat exchange in the absorption refrigerating machine, it is advantageous to minimize the flow rate and reduce the required passage area.

When cooling water is flowed through an absorber and a condenser of an absorption refrigerating machine, the flow rate of the cooling water flowed into respective heat exchangers can be made smaller in the case of flowing in parallel than in the case of flowing in series. Thus, when the plate type heat exchangers are used, it is more advantageous to flow cooling water in parallel. However, there has not been known a system in which plate type heat exchangers are used in an absorber and a condenser for an absorption refrigerating machine and cooling water is flowed therethrough in parallel.

When cooling water is flowed in parallel, in order to match the flow rates introduced into an absorber and a condenser with design values, a flow regulating valve may be provided in a cooling water passage to adjust the flow rates by a passage resistance generated by the flow regulating valve. However, it is complicated to adjust the flow regulating valve based on fluctuations in the water pressure, causing operational problems.

DISCLOSURE OF INVENTION

The present invention has been made in view of the above drawbacks, and it is therefore an object of the present invention to provide an absorption refrigerating machine which uses plate type heat exchangers in an absorber and a condenser, and can adjust the amount of distribution of cooling water without a flow regulating valve provided in a cooling water passage, and has no operational problem.

To solve the above problems, according to an aspect of the present invention, there is provided an absorption refrigerating machine using plate type heat exchangers at least in an absorber and a condenser, characterized in that cooling water is supplied in parallel to the plate type heat exchangers in the absorber and the condenser, and amounts of cooling water distributed to the absorber and the condenser are determined mainly based on fluid resistance of each of the plate type heat exchangers.

According to another aspect of the present invention, there is provided an absorption refrigerating machine using plate type heat exchangers in an absorber and a condenser, characterized in that cooling water is supplied in parallel to the plate type heat exchangers in the absorber and the condenser via a cooling water passage, and a flow regulating valve for distributing cooling water to the absorber and the condenser is not provided in the cooling water passage, but cooling water is directly supplied via the cooling water passage to the absorber and the condenser.

In the absorption refrigerating machine, the plate type heat exchangers used in the absorber and the condenser should preferably have the same shape of the plates and the different number of plates. Further, a ratio of the number of plates in the absorber to the number of plates in the condenser should preferably be in the range of 67:33 to 60:40.

BRIEF DESCRIPTION OF DRAWINGS

FIG. 1 is an entire configurational view showing an example of an absorption refrigerating machine using plate type heat exchangers according to the present invention;

BEST MODE FOR CARRYING OUT THE INVENTION

Figure 2:
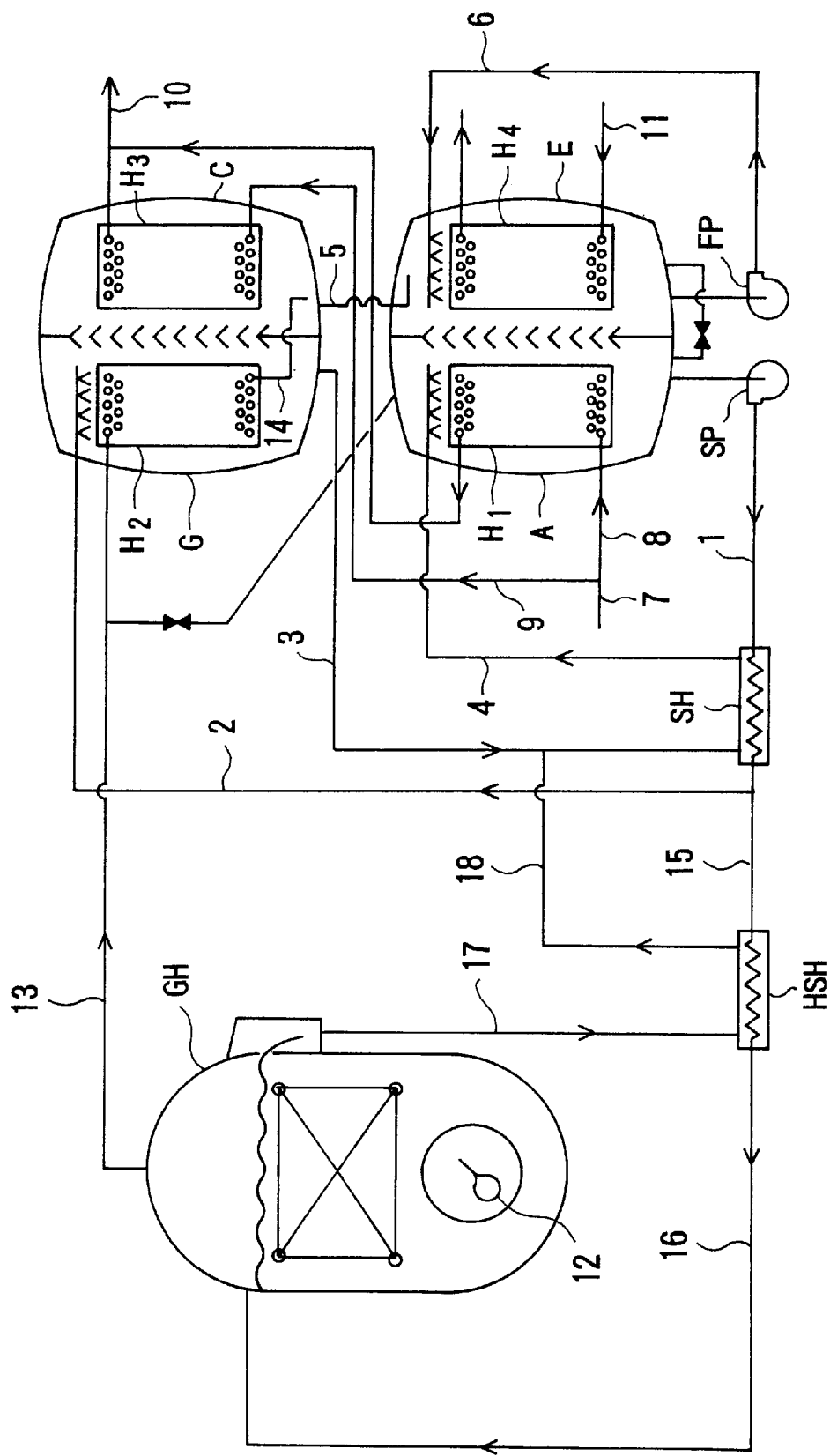
FIG. 2 is an entire configurational view of a double effect absorption heater chiller showing another example of an absorption refrigerating machine using plate type heat exchangers according to the present invention.

According to the present invention, the amount of distribution of cooling water is adjusted in consideration of the fluid resistance of a plate type heat exchanger. Its principle makes use of the fact that the fluid resistance in the heat exchanger portion is higher than the fluid resistance in piping, and is thus predominant.

Next, the amounts of cooling water distributed to an absorber and a condenser are calculated as follows:

Heat input quantity from heat source to high temperature regenerator QG

Heat input quantity from chilled water to evaporator QE

Heat output quantity from absorber to cooling water QA

Heat output quantity from condenser to cooling water QC

Generally, in the case of a double effect absorption refrigerating machine, COP=about 1.15 to about 1.3. On the assumption that COP=1.25, when COP=QE/QG=1.25, QA/QE=about 1.25 and QC/QE=about 0.55.

If cooling water is flowed to the absorber at a rate of [QA/(QA+QC)]×100=69.4%, and to the condenser at a rate of [QC/(QA+QC)]×100=30.6%, then the outlet temperature of the cooling water in the absorber becomes equal to the outlet temperature of the cooling water in the condenser.

If the absorber is constituted by a plate type heat exchanger, cooling water and an absorption solution can form complete counter flows. By making use of the absorption solution having a high temperature at the inlet, the cooling water at the outlet can be maintained at a high temperature to a certain degree.

When the flow rate in proportion to the heat quantity is supplied to the absorber (A) and the condenser (C), the difference (temperature rise) between the outlet temperature and the inlet temperature of the cooling water in the absorber is equal to the difference between the outlet temperature and the inlet temperature of the cooling water in the condenser.

$$QA = GA \times Cp \times \Delta TA$$

$$QC = GC \times Cp \times \Delta TC$$

When QA/QC=GA/GC, ΔTA=ΔTC.

Since the inlet temperature of the cooling water in the absorber is equal to the inlet temperature of the cooling water in the condenser, the outlet temperature of the cooling water in the absorber is also equal to the outlet temperature of the cooling water in the condenser.

In the above equations, GA represents the flow rate of cooling water flowed to the absorber, GC the flow rate of the cooling water flowed to the condenser, and Cp specific heat. ΔTA represents the difference between the inlet temperature and the outlet temperature of the cooling water in the absorber, and ΔTC represents the difference between the inlet temperature and the outlet temperature of the cooling water in the condenser.

By making the flow rate in the absorber relatively lower and the flow rate in the condenser relatively greater, the condensation temperature can be lowered. Consequently, the pressure and the solution temperature in the high temperature regenerator can be lowered to effectively suppress corrosion. This can be realized by the condition of ΔTA>ΔTC.

On the assumption that ΔTA=(1 to 1.35)×ΔTC, if QA:QC=67:33 and ΔTA=ΔTC, then GA:GC=67:33.

If ΔTA=1.35×ΔTC, then GA:GC=60:40

In the present invention, as described above, cooling water was flowed in amounts of distribution of about 60% to about 67% to the absorber, and about 40% to about 33% to the condenser, and the outlet temperature of the absorber is made higher than the outlet temperature of the condenser. It was confirmed that the pressure and the solution temperature of the high temperature regenerator could be lowered to suppress corrosion.

In a plate type heat exchanger, the fluid resistance of water is mainly determined based on the resistance of the heat exchanger portion. Therefore, when the ratio of the number of plates in a plate type heat exchanger for the absorber to the number of plates in a plate type heat exchanger for the condenser is in the range of 67:33 to 60:40, the amount of about 60% to about 67% of the cooling water can be flowed to the absorber, and the amount of about 40% to about 33% of the cooling water can be flowed to the condenser.

Next, the present invention will be described in detail with the use of the drawings.

FIG. 1 is an entire configurational view of a single effect absorption refrigerating machine showing an example of an absorption refrigerating machine using plate type heat exchangers according to the present invention.

In FIG. 1, A denotes an absorber, G a regenerator, C a condenser, E an evaporator, SH a solution heat exchanger, SP a solution pump, FP a refrigerant pump, $H_1$ to $H_4$ plate type heat exchangers, 1 to 4 solution passages, 5 and 6 refrigerant passages, 7 to 10 cooling water passages, 11 a chilled water passage, and 12 a heat source passage.

In this absorption refrigerating machine, a concentrated solution changes into a dilute solution by absorbing, in the absorber A, a refrigerant vapor evaporated in the evaporator E. The dilute solution is passed through the passage 1 and a heated side of the solution heat exchanger SH, and then introduced into the regenerator G via the passage 2 by the solution pump SP. The dilute solution introduced into the regenerator G is heated by the heat source 12 to evaporate the refrigerant, so that the dilute solution changes into a concentrated solution. The concentrated solution is passed through the passage 3 and the heating side of the solution heat exchanger SH, and then introduced via the passage 4 into the absorber A, where the concentrated solution absorbs a refrigerant vapor again to change into a dilute solution. Thus, the solution is circulated.

On the other hand, the refrigerant becomes a refrigerant vapor by being evaporated in the regenerator G. The refrigerant vapor reaches the condenser C, where the refrigerant vapor is condensed into a refrigerant liquid, which is introduced into the evaporator E via the passage 5. While the introduced refrigerant liquid is circulated into the evaporator E via the passage 6 by the refrigerant pump FP, the refrigerant liquid is evaporated in the evaporator E for cooling chilled water 11. The evaporated refrigerant reaches the absorber A, where the refrigerant is absorbed into the concentrated solution. The absorbed refrigerant reaches the regenerator G, where the refrigerant is evaporated. Thus, the refrigerant is circulated.

The cooling water is introduced through the passage 7 and branched into a flow through the passage 8 and a flow through the passage 9. These flows are respectively introduced into the absorber A and the condenser C and discharged through the passage 10.

FIG. 2 is an entire configurational view of a double effect absorption heater chiller showing another example of an absorption refrigerating machine using plate type heat exchangers according to the present invention.

In FIG. 2, A denotes an absorber, G a low temperature regenerator, C a condenser, E an evaporator, GH a high temperature regenerator, HSH a high temperature solution heat exchanger, SH a low temperature solution heat exchanger, SP a solution pump, FP a refrigerant pump, $H_1$ to $H_4$ plate type heat exchangers, 1 to 4 and 15 to 18 solution passages, 5, 6, 13 and 14 refrigerant passages, 7 to 10 cooling water passages, 11 a chilled water passage, and 12 a heating source.

With respect to a solution passage in this absorption heater chiller, a concentrated solution changes into a dilute solution by absorbing, in the absorber A, a refrigerant vapor evaporated in the evaporator E. The dilute solution is passed through the passage 1 and a heated side of the low temperature solution heat exchanger SH, and then branched. A part of the solution is passed through a conduit 15 and a heated side of the high temperature solution heat exchanger HSH, and then introduced the high temperature regenerator GH via a conduit 16. In the high temperature regenerator GH, the dilute solution is heated by the heating source 12 to evaporate the refrigerant, so that the dilute solution changes into a concentrated solution. The concentrated solution is passed through a conduit 17, exchanged heat in the high temperature solution heat exchanger HSH, and joined at a conduit 18 into the concentrated solution conduit 3 extending from the low temperature regenerator G.

The rest of the dilute solution branched is introduced via the conduit 2 into the low temperature regenerator G, where the dilute solution is heated and concentrated by a refrigerant vapor 13 from the high temperature regenerator. Then, the concentrated solution is joined into the concentrated solution conduit 18 at the conduit 3, and passes through a heating side of the low temperature solution heat exchanger SH. Then, the concentrated solution is introduced into the absorber A via the conduit 4, and absorbs a refrigerant vapor again to change into a dilute solution. Thus, the solution is circulated.

On the other hand, with respect to a refrigerant passage, a refrigerant vapor generated in the high temperature regenerator GH is introduced via the conduit 13 into the low temperature regenerator G, where the dilute solution is heated and concentrated to generate a refrigerant vapor and condense the introduced refrigerant vapor. Then, the condensed refrigerant reaches the condenser C via the conduit 14. The refrigerant vapor generated in the low temperature regenerator G is condensed into a refrigerant liquid in the condenser C, and the refrigerant liquid is introduced into the evaporator E via the passage 5 together with the refrigerant from the high temperature regenerator. The introduced refrigerant liquid is circulated into the evaporator E via the passage 6 by the refrigerant pump FP and evaporated therein to cool the chilled water 11. The evaporated refrigerant reaches the absorber A, and is absorbed into the concentrated solution. The absorbed refrigerant further reaches the high temperature regenerator GH and the low temperature regenerator G, where the refrigerant is evaporated. Thus, the refrigerant is circulated.

The cooling water is introduced through the passage 7 and branched into a flow through the passage 8 and a flow through the passage 9. These flows are respectively introduced into the absorber A and the condenser C and discharged through the passage 10.

In the aforementioned cycle according to the present invention, there are used the plate type heat exchangers $H_1$, $H_2$, $H_3$ and $H_4$ for exchanging heat in the absorber A, the regenerator G (low temperature regenerator), the condenser C, and the evaporator E.

Figure 3:
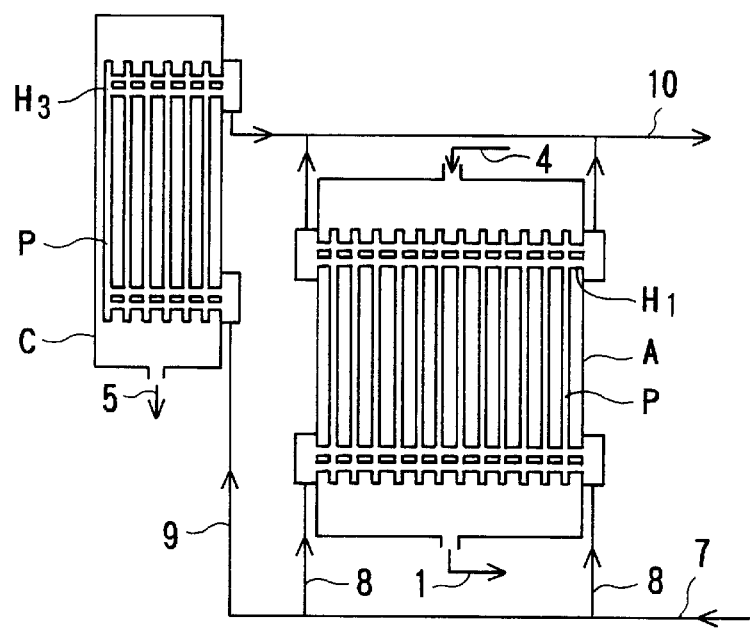
FIG. 3 is an enlarged cross-sectional view of a plate type heat exchanger portion in an absorber and a condenser shown in FIGS. 1 and 2.
Figure 4:
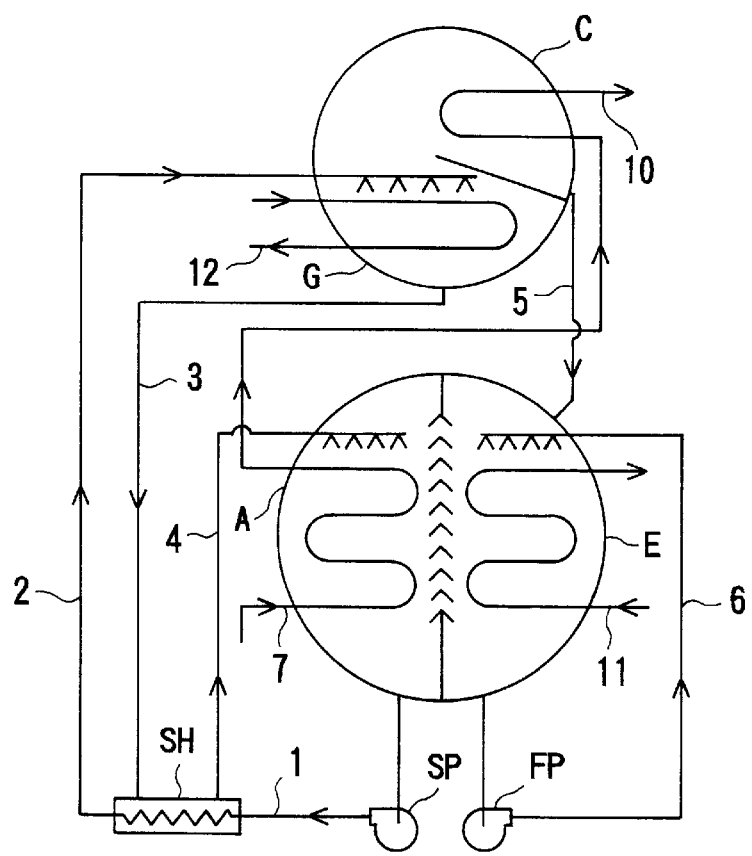
FIG. 4 is an entire configurational view showing a conventional absorption refrigerating machine.

FIG. 3 is an enlarged cross-sectional view showing an example of only the plate type heat exchanger portion of each of the absorber A and the condenser C through which cooling water is passed. In this example, the number of plates P of the plate type heat exchangers $H_1$ for the absorber A is twelve, and the number of plates P of the plate type heat exchangers $H_3$ for the condenser C is six.

In this case, the distribution ratio of the number of plates is absorber: condenser=12/(12+6):6/(12+6)=67:33. Thus, when there is a difference in the number of plates, the amounts of cooling water supplied to the absorber and the condenser can appropriately be distributed.

In the foregoing descriptions, a double effect absorption heater chiller has been described. However, the present invention can similarly be applied to a single effect or multiple effect absorption refrigerating machine or an absorption heater chiller that comprises an absorber and a condenser to be cooled by cooling water.

Further, a plate type heat exchanger used in the present invention may comprise any known plate type heat exchanger, as long as it has a flow resistance to a certain degree and is composed of the same plates, and plate type heat exchangers having the different number of plates are used in both of an absorber and a condenser.

According to the present invention, a refrigerating machine is constituted by a simple configuration such that a plate type heat exchanger is used for an absorber and a condenser, and the number of plates of the heat exchanger is different between the absorber and the condenser. This configuration can adjust the amounts of distribution of cooling water passed through the absorber and the condenser and dispense with a flow regulating valve for adjusting the amount of distribution, and hence a refrigerating machine having no operational problem can be provided.

Industrial Applicability

The present invention can be used for an absorption refrigerating machine or an absorption heater chiller having an absorber and a condenser.

What is claimed is:

1. An absorption refrigerating machine using plate type heat exchangers at least in an absorber and a condenser, characterized in that cooling water is supplied in parallel with each other respectively to said plate type heat exchanger in said absorber and said plate type heat exchanger in said condenser, and amounts of cooling water distributed to said absorber and said condenser are determined mainly based on fluid resistance of each of said plate type heat exchangers.

2. An absorption refrigerating machine using plate type heat exchangers at least in an absorber and a condenser, characterized in that cooling water is supplied in parallel to said plate type heat exchangers in said absorber and said condenser, and amounts of cooling water distributed to said absorber and said condenser are determined mainly based on fluid resistance of each of said plate type heat exchangers, wherein said plate type heat exchangers used in said absorber and said condenser have the same shape of the plates and the different number of plates.

3. An absorption refrigerating machine according to claim 1, characterized in that a ratio of the number of plates in the absorber to the number of plates in the condenser is in the range of 67:33 to 60:40.

4. An absorption refrigerating machine using plate type heat exchangers in an absorber and a condenser, characterized in that cooling water is supplied in parallel to said plate type heat exchangers in said absorber and said condenser via a cooling water passage, and a flow regulating valve for distributing cooling water to said absorber and said condenser is not provided in said cooling water passage, but cooling water is directly supplied via said cooling water passage to said absorber and said condenser.

5. An absorption refrigerating machine having an absorber and a condenser and using plate type heat exchangers at least in said absorber and said condenser, wherein said plate type heat exchangers present fluid resistance to cooling water supplied thereto, and the fluid resistances provided by said plate type heat exchangers determine the amounts of cooling water distributed to said absorber and to said condenser, wherein cooling water is supplied in parallel to each of said plate type heat exchangers whereby the amounts of cooling water distributed to each of said absorber and said condenser are based mainly on the fluid resistance presented by the respective plate type heat exchangers thereof.

* * * * *

UNITED STATES PATENT AND TRADEMARK OFFICE
CERTIFICATE OF CORRECTION

PATENT NO.    : 6,442,964 B1
DATED         : September 3, 2002
INVENTOR(S)   : Inoue et al.

It is certified that error appears in the above-identified patent and that said Letters Patent is hereby corrected as shown below:

<u>Column 6,</u>
Lines 42 and 43, change, "according to claim 1" to be -- according to claim 2 --

Signed and Sealed this

Fourth Day of March, 2003

JAMES E. ROGAN
*Director of the United States Patent and Trademark Office*